(12) United States Patent
Onoda

(10) Patent No.: US 9,972,823 B2
(45) Date of Patent: May 15, 2018

(54) FUSIBLE LINK

(71) Applicant: YAZAKI CORPORATION, Minato-ku, Tokyo (JP)

(72) Inventor: Shinya Onoda, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 428 days.

(21) Appl. No.: 14/828,827

(22) Filed: Aug. 18, 2015

(65) Prior Publication Data

US 2015/0357623 A1  Dec. 10, 2015

Related U.S. Application Data

(63) Continuation of application No. PCT/JP2014/053136, filed on Feb. 12, 2014.

(30) Foreign Application Priority Data

Feb. 22, 2013  (JP) ................. 2013-033734

(51) Int. Cl.
*H01H 85/12* (2006.01)
*H01M 2/34* (2006.01)
*H01H 85/02* (2006.01)

(52) U.S. Cl.
CPC ............. *H01M 2/34* (2013.01); *H01H 85/12* (2013.01); *H01H 2085/025* (2013.01); *H01M 2200/00* (2013.01)

(58) Field of Classification Search
CPC .... H01M 2/34; H01M 2200/00; H01H 85/12; H01H 2085/025

(Continued)

(56) References Cited

U.S. PATENT DOCUMENTS 5,645,448 A * 7/1997 Hill ................. H01H 85/205
439/522
6,294,978 B1 * 9/2001 Endo .................. H01H 85/044
337/159

(Continued)

FOREIGN PATENT DOCUMENTS

JP   2005-116309 A   4/2005
JP   2009-289602 A   12/2009
JP   2010-251176 A   11/2010

OTHER PUBLICATIONS

International Search Report for PCT/JP2014/053136 dated Apr. 28, 2014 [PCT/ISA/210].

(Continued)

*Primary Examiner* — Anatoly Vortman
(74) *Attorney, Agent, or Firm* — Sughrue Mion, PLLC

(57) ABSTRACT

In a fusible link, a fuse element integrally formed with a metallic plate includes a battery coupling plate and two external coupling plates. The battery coupling plate is coupled to a battery terminal. The external coupling plates are coupled through fusible parts to connecting plates extending to both sides of the battery coupling plate. Three resin housings support the fuse element so as to expose the connecting plates among the housings adjacent to each other. The installation configuration of the fuse element can be selected depending on the space on the battery side, thereby achieving increased flexibility of and reduction in the space for the fusible link mounted on the battery.

6 Claims, 6 Drawing Sheets

(58) Field of Classification Search
USPC .................................. 337/159, 186, 207–209
See application file for complete search history.

(56) References Cited

U.S. PATENT DOCUMENTS

| | | | | |
|---|---|---|---|---|
| 6,509,824 B2* | 1/2003 | Inaba | ................... | H01H 85/044 29/623 |
| 6,576,838 B2* | 6/2003 | Matsumura | .......... | H01H 85/044 174/135 |
| 6,830,482 B2* | 12/2004 | Matsumura | .......... | H01H 85/044 29/623 |
| 7,176,780 B2* | 2/2007 | Iwata | ................... | H01H 85/044 337/161 |
| 7,192,319 B1* | 3/2007 | Rahman | ............... | H01H 85/044 439/766 |
| 7,663,466 B1* | 2/2010 | Jetton | ................... | H01H 85/044 337/186 |
| 2002/0163416 A1* | 11/2002 | Matsumura | .......... | H01H 85/044 337/112 |
| 2004/0008503 A1* | 1/2004 | Higuchi | ............... | H01H 85/044 361/833 |
| 2005/0285709 A1* | 12/2005 | Matsumura | .......... | H01H 85/044 337/227 |
| 2009/0061291 A1* | 3/2009 | Ohashi | ................... | B60R 16/04 429/65 |

OTHER PUBLICATIONS

Written Opinion of the International Search Authority for PCT/JP2014/053136 dated Apr. 28, 2014 [PCT/ISA/237].

\* cited by examiner

FUSIBLE LINK

CROSS-REFERENCE TO RELATED APPLICATION

This application is a continuation application of International Application PCT/JP2014/053136, filed on Feb. 12, 2012, and designating the U.S., the entire contents of which are incorporated herein by reference.

BACKGROUND OF THE INVENTION

1. Field of the Invention

The present invention relates to a fusible link directly mounted on a battery terminal.

2. Description of the Related Art

FIG. 6 is a diagram illustrating a fusible link disclosed in the later-described Japanese Patent Application Laid-open No. 2005-116309.

This fusible link 100 is directly mounted on a battery terminal 220 coupled to a battery post 210 of a battery 200 mounted on a vehicle.

The fusible link 100 includes a fuse element 110 integrally formed with a metallic plate and two resin housings, a first housing 120 and a second housing 130, supporting the fuse element 110.

The fuse element 110 includes a battery coupling plate 111 and a plurality of tongue-like external coupling plates 114. The battery coupling plate 111 is coupled to a stud bolt 221 of the battery terminal 220. The external coupling plates 114 are coupled through a fusible part 113 to a plurality of connecting plates 112 branched from the battery coupling plate 111. If a current with a value equal to or larger than a rated current value flows, the fusible part 113 is fused to protect an external circuit coupled to the external coupling plate 114.

The first housing 120 supports the base end of the connecting plates 112 and the battery coupling plate 111. The second housing 130 supports the tip end of the connecting plates 112 and the base end of the external coupling plates 114. The connecting plates 112 exposed between the first housing 120 and the second housing 130 are bent portions.

The first housing 120 and the second housing 130 are configured to be orthogonal to each other by bending the connecting plates 112 exposed therebetween at right angle, as illustrated in the diagram.

The fusible link 100 disclosed in Japanese Patent Application Laid-open No. 2005-116309 is disposed so that the second housing 130 is laid on a side surface 201 of the battery 200 if the fusible link 100 is mounted on the battery 200 through the battery terminal 220.

The reference numeral 150 in FIG. 6 refers to another fusible link additionally coupled to the fusible link 100. The reference numeral 160 refers to a power feed connector of an external device coupled to the external coupling plate 114 of the fusible link 100. The reference numeral 170 refers to a power feed connector of an external device coupled to an external coupling plate 151 of the fusible link 150.

The fusible link 100 disclosed in Patent Literature 1, however, can be installed to the battery 200 with only one installation configuration. If the installation space on the battery side is changed, the installation configuration of the fusible link 100 cannot be changed. That is, the fusible link 100 has low flexibility.

Recently, increased number of electric circuits mounted on a vehicle also increases number of fusible links mounted on the vehicle. This tendency generates the needs of saving the space for installing a fusible link.

SUMMARY OF THE INVENTION

In view of the circumstances described above, the present invention aims to provide a fusible link the installation configuration of which can be selected depending on the space on the battery side, thereby achieving increased flexibility of and the reduction in the space for the fusible link mounted on the battery.

In order to solve the above mentioned problem and achieve the object, a fusible link according to the present invention is directly mounted on a battery terminal. The fusible link includes a fuse element integrally formed with a metallic plate; and three resin housings configured to support the fuse element. The fuse element includes a battery coupling plate coupled to the battery terminal; a pair of connecting plates configured to extend outward from respective side edges opposing to each other of the battery coupling plate in opposing direction thereof; two external coupling plates configured to each couple to an external circuit and which are disposed on both sides of the battery coupling plate in a separate state from the connecting plates and the battery coupling plate in an area surrounded with the side edges of the battery coupling plate from which the connecting plates extend and the connecting plates; and a fusible part configured to conductively couple the connecting plate to an external coupling plate opposing to each other and which is fused if a current with a value equal to or larger than a rated current value flows. The three resin housings include a first housing configured to house therein the battery coupling plate so that the pair of connecting plates externally protrude; a second housing configured to house therein the connecting plate, the fusible part, and the external coupling plate positioned at one side of the first housing, in a state in which a part of the connecting plate is exposed between the second housing and the first housing; and a third housing configured to house therein the connecting plate, the fusible part, and the external coupling plate positioned at another side of the first housing, in a state in which a part of the connecting plate is exposed between the third housing and the first housing. Orientation of the second housing and orientation of the third housing relative to the first housing can be changed by bending the connecting plates exposed among the housings.

In the above-described fusible link, three resin housings support a fuse element and connecting plates exposed among the housings adjacent to each other are bent. This configuration allows the fusible link to be used in a compact state with a tri-fold configuration, thereby achieving reduction in the space for the fusible link mounted on a battery.

The bending orientation of the connecting plates exposed among the housings adjacent to each other can be selected upward or downward depending on the space on the battery side. In other words, the installation configuration of the fusible link can be selected depending on the space on the battery side, thereby achieving increased flexibility of the fusible link.

Further, in the fusible link according to another aspect of the present invention, it is preferable that on both side edges of the battery coupling plate, reinforcing plates extending from the side edges of the battery coupling plate are integrally formed in parallel with the connecting plates, and the second housing and the third housing each retain a tip end of the respective reinforcing plates extending to the second housing or the third housing so as to bend the reinforcing plates extending to the second housing or the third housing together with the respective connecting plates.

In the above-described fusible link, bending the connecting plates exposed among the housings adjacent to each other also bends the reinforcing plates at the same time. If some rigidity is provided to the reinforcing plates for retaining the shape of bend, vibrations of a vehicle are hardly transmitted to the connecting plates serving as electrically conducting paths. This achieves increased durability of the fuse element.

Further, in the fusible link according to still another aspect of the present invention, it is preferable that the first housing includes a housing lock part configured to fix the orientation of the second housing or the third housing by engaging with an engaging part on the housing when the orientation of which is changed by bending of the connecting plates.

In the above-described fusible link, bending the connecting plates exposed among the housings adjacent to each other fixes the relational position among the housings due to the engagement of the engaging parts with the respective housing lock part on the housings. If vibrations of a vehicle are transmitted to the fusible link, the housings are therefore prevented from vibrating with a fulcrum of the connecting plates or the reinforcing plates. This configuration reduces the potential fatigue failure caused by vibrations of the connecting plates or the reinforcing plates.

If tension works on a cable from an external circuit coupled to the external coupling plate, the tension is prevented from working on the connecting plate and the reinforcing plate as a bending load. This achieves increased durability of the connecting plates and the reinforcing plates.

Further, in the fusible link according to still another aspect of the present invention, it is preferable that the housing lock part is mounted on each of the positions nearer to both side edges on both outer surfaces opposing to each other in a plate-thickness direction of the battery coupling plate.

In the above-described fusible link, the engaging parts of the respective second housing and the third housing are locked by the housing lock part mounted on the side of the first housing regardless of the bending direction of the connecting plates and the reinforcing plates, that is, toward the side of the upper surface of the first housing or toward the side of the lower surface of the first housing. This configuration allows the second housing and the third housing to be fixed to the first housing. Accordingly, regardless of the bending direction of the connecting plates, the second housing and the third housing the orientations of which are changed can be securely fixed to the first housing.

The present invention has been briefly described. The present invention can be clearly understood in detail by reading through the description of an embodiment to achieve the present invention (hereinafter referred to as the "embodiment") below with reference to the accompanying drawings.

DETAILED DESCRIPTION OF THE PREFERRED EMBODIMENTS

A preferred embodiment of a fusible link according to the present invention will be explained in detail with reference to accompanying drawings.

Figure 1:
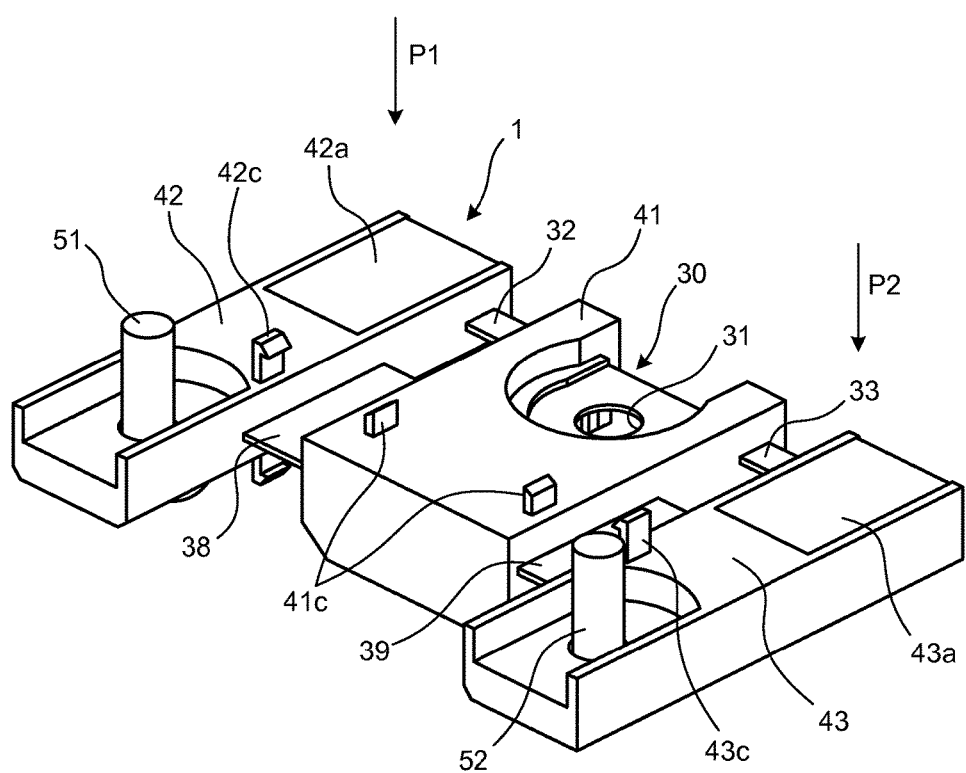
FIG. 1 is a perspective view illustrating the initial state of a fusible link according to an embodiment of the present invention.
Figure 2:
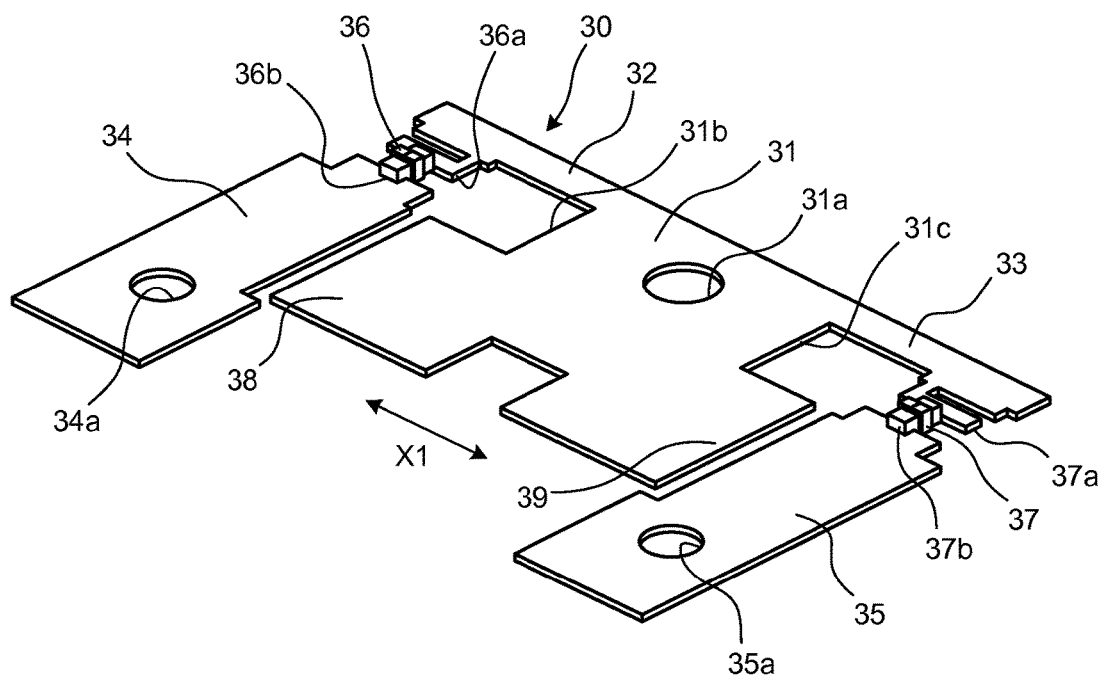
FIG. 2 is a perspective view illustrating the developed state of a fuse element used for the fusible link according to the embodiment.
Figure 3:
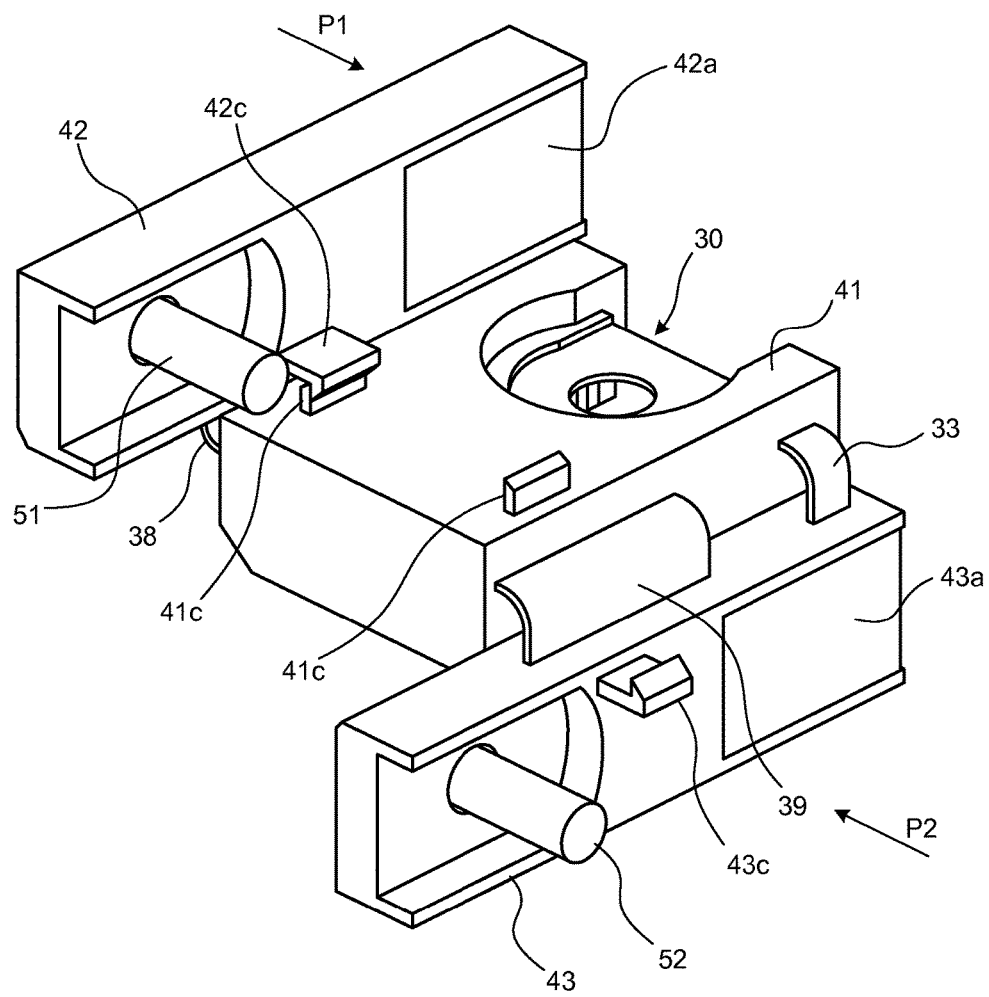
FIG. 3 is a perspective view illustrating a first installation configuration of the fusible link illustrated in FIG. 1.
Figure 4:
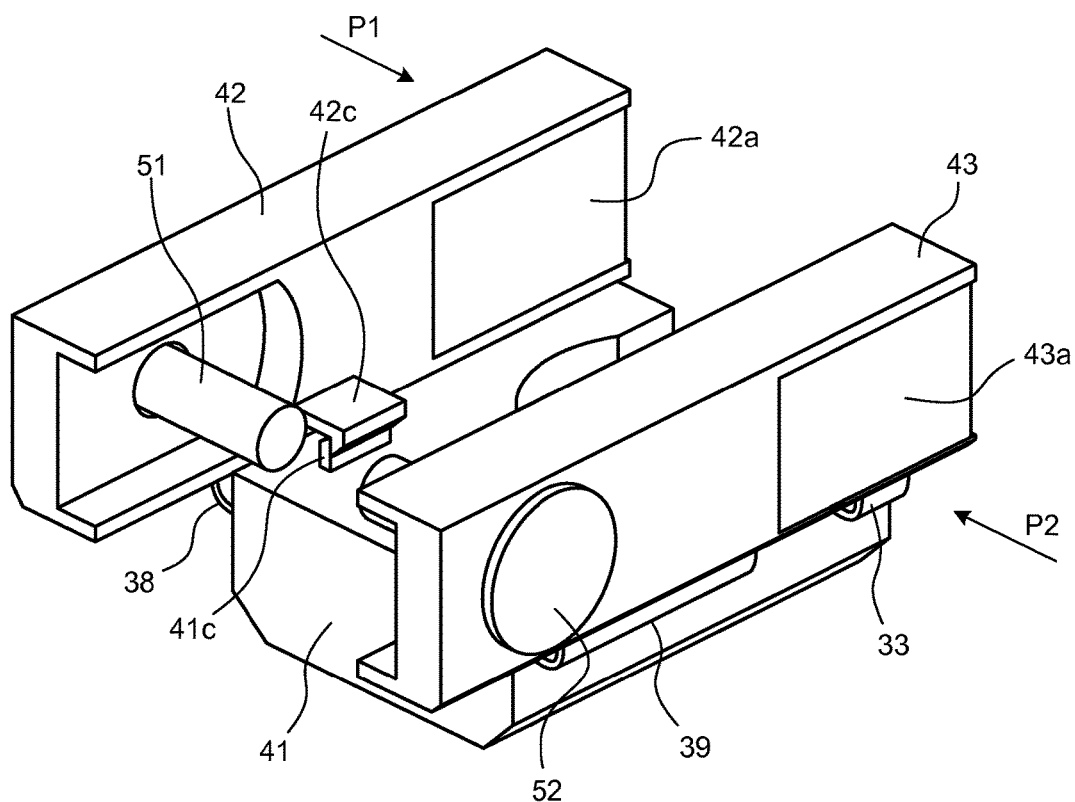
FIG. 4 is a perspective view illustrating a second installation configuration of the fusible link illustrated in FIG. 1.
Figure 5:
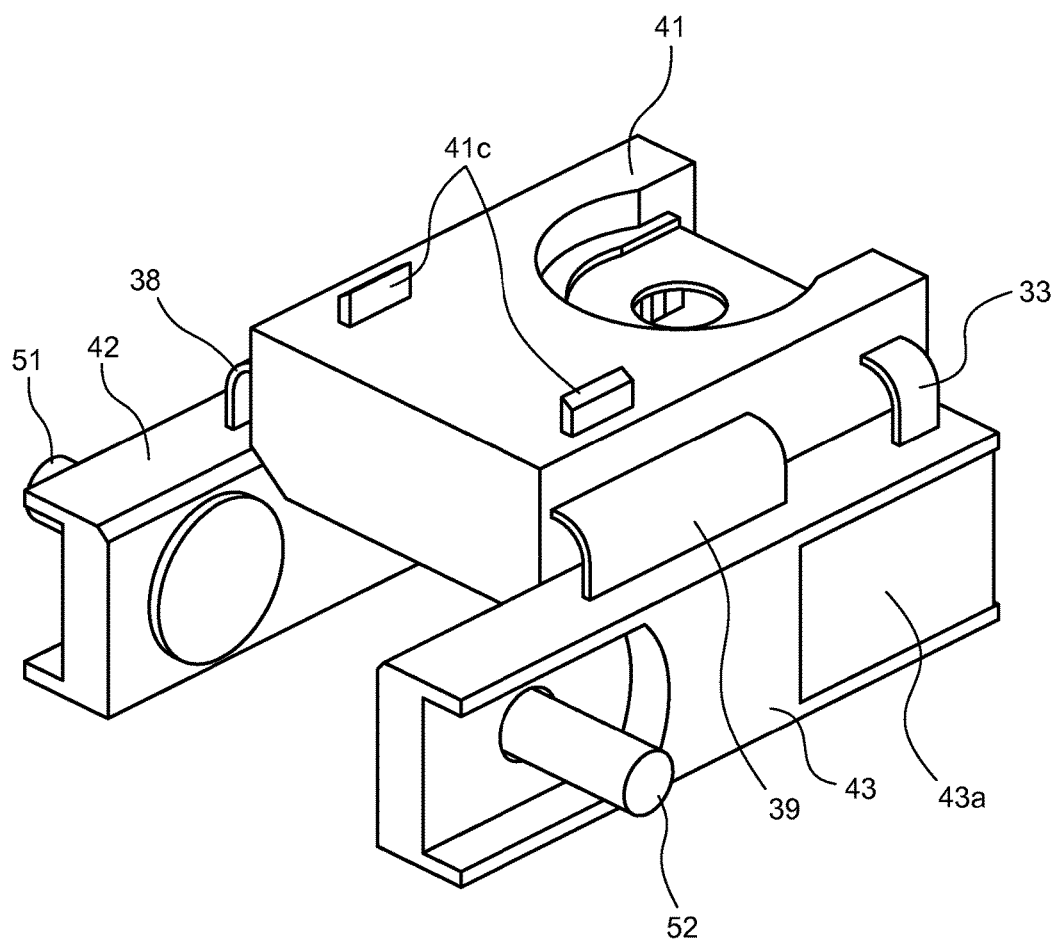
FIG. 5 is a perspective view illustrating a third installation configuration of the fusible link illustrated in FIG. 1.
Figure 6:
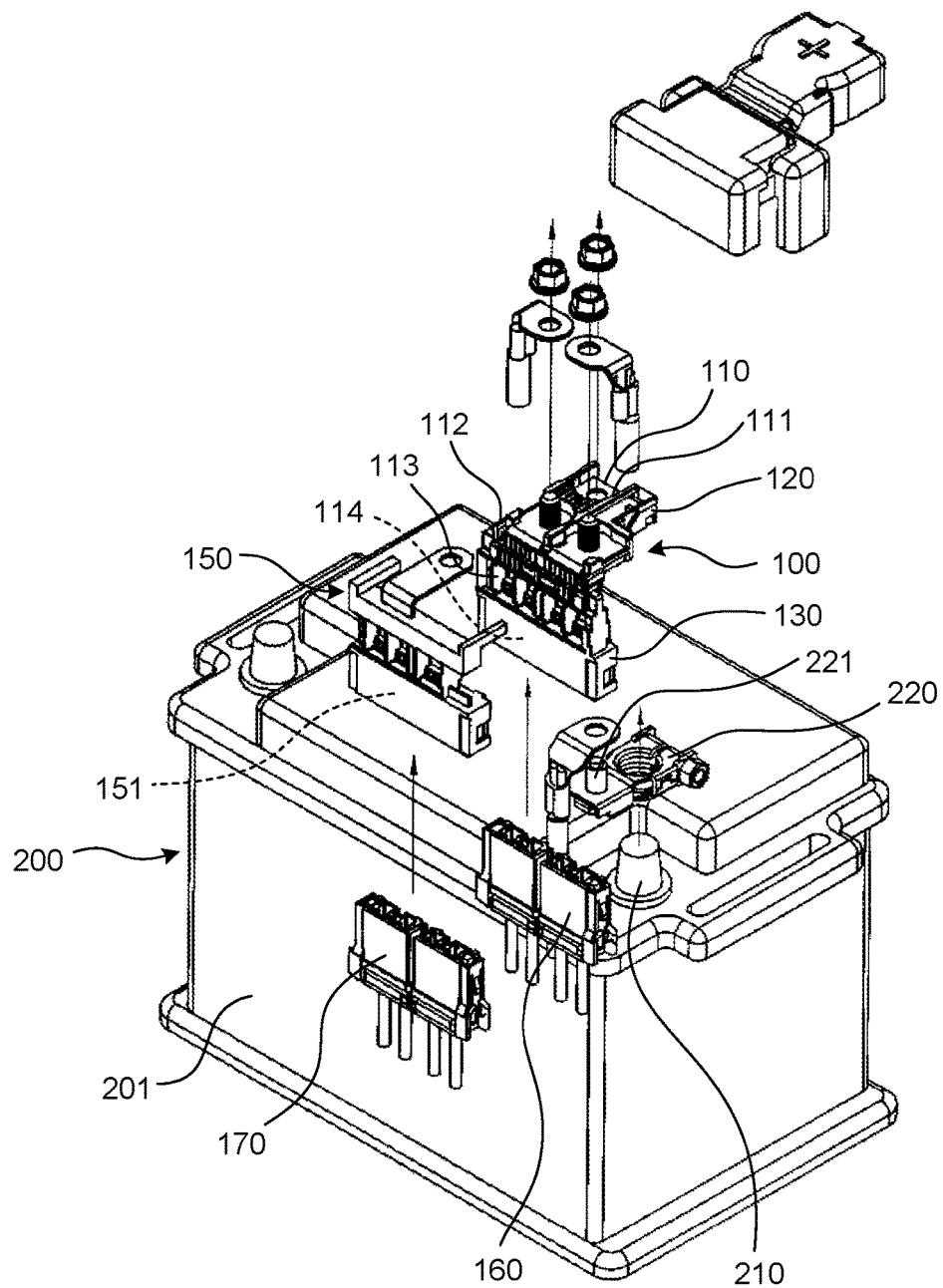
FIG. 6 is a perspective view illustrating a conventional fusible link according to a related art.

FIGS. 1 to 5 are diagrams illustrating the fusible link according to the embodiment of the present invention. FIG. 1 is a perspective view illustrating the initial state of the fusible link according to the embodiment of the present invention. FIG. 2 is a perspective view illustrating the developed state of a fuse element used for the fusible link according to the embodiment. FIG. 3 is a perspective view illustrating a first installation configuration of the fusible link illustrated in FIG. 1. FIG. 4 is a perspective view illustrating a second installation configuration of the fusible link illustrated in FIG. 1. FIG. 5 is a perspective view illustrating a third installation configuration of the fusible link illustrated in FIG. 1.

A fusible link 1 includes a fuse element 30 integrally formed with a metallic plate and three resin housings supporting the fuse element 30: a first housing 41, a second housing 42, and a third housing 43. The fusible link 1 is directly mounted on a battery terminal (not-illustrated) coupled to a battery post of a battery mounted on a vehicle.

The fuse element 30 includes, as illustrated in FIG. 2, a battery coupling plate 31, a pair of connecting plates 32 and 33, two external coupling plates 34 and 35, a pair of fusible parts 36 and 37, and a pair of reinforcing plates 38 and 39. The battery coupling plate 31 is coupled to a not-illustrated battery terminal. The connecting plates 32 and 33 extend from the battery coupling plate 31. The two external coupling plates 34 and 35 are coupled to external circuits. The reinforcing plates 38 and 39 extend from the battery coupling plate 31 in parallel with the connecting plates 32 and 33, respectively.

The battery coupling plate 31 includes a mounting hole 31a into which the battery coupling plate 31 is screwed with a stud bolt of the not-illustrated battery terminal.

As illustrated in FIG. 2, the pair of connecting plates 32 and 33 extend outward from the respective side edges 31b and 31c opposing to each other of the battery coupling plate 31 in their opposing directions (in the directions represented with the arrow in FIG. 2).

The two external coupling plates 34 and 35 are disposed on both sides of the battery coupling plate 31 in the area surrounded with the side edges 31b and 31c of the battery coupling plate 31 and the connecting plates 32 and 33. The two external coupling plates 34 and 35 are disposed in a separate state from the connecting plates 32 and 33, and the side edges 31b and 31c of the battery coupling plate 31.

In the tip portions of the two external coupling plates 34 and 35, bolt mounting holes 34a and 35a are defined. Into the bolt mounting holes 34a and 35a, as illustrated in FIG. 1, stud bolts 51 and 52 are inserted in an engaged manner to screw the terminal of the external circuits, respectively.

The fusible part 36 conductively couples the connecting plate 32 to the base end of the external coupling plate 34 opposing to each other. The fusible part 36 includes a low-melting metal chip 36b deposited on a narrow belt-like conductive part 36a. The fusible part 36 is fused if a current flows with a value equal to or larger than a rated current value determined in advance.

The fusible part 37 conductively couples the connecting plate 33 to the base end of the external coupling plate 35 opposing to each other. The fusible part 37 includes a low-melting metal chip 37b deposited on a narrow belt-like conductive part 37a. The fusible part 37 is fused if a current flows with a value equal to or larger than a rated current value determined in advance.

The pair of reinforcing plates 38 and 39 are, as illustrated in FIG. 2, integrally formed with the battery coupling plate 31. The reinforcing plates 38 and 39 extend from the side edges of the battery coupling plate 31 in parallel with the pair of connecting plates 32 and 33, respectively. Although the tip end of the reinforcing plate 38 is disposed near the external coupling plate 34, a clearance is secured between the reinforcing plate 38 and the external coupling plate 34. In the same manner, the tip end of the reinforcing plate 39 is disposed near the external coupling plate 35, and a clearance is secured between the reinforcing plate 39 and the external coupling plate 35.

The first housing 41 houses therein the battery coupling plate 31, as illustrated in FIG. 1, so that a pair of connecting plates 32 and 33 externally protrude.

On the first housing 41, as illustrated in FIG. 1, housing lock means (housing lock part) 41c are mounted. The housing lock means 41c are mounted on the positions nearer to both side edges on both upper and lower outer surfaces of the first housing 41 opposing to each other in the plate-thickness direction of the battery coupling plate 31.

As illustrated in FIG. 4, the housing lock means 41c mounted on the upper surface of the first housing 41 are configured to engage with engaging parts 42c and 43c mounted on the upper surface of the second housing 42 and the third housing 43 the orientations of which are changed if the connecting plates 32 and 33 and the reinforcing plates 38 and 39 are bent upward at right angle. The housing lock means 41c thereby fix the orientations of the housings 42 and 43.

As illustrated in FIG. 5, the housing lock means 41c mounted on the lower surface of the first housing 41, which are not illustrated, are configured to engage with the engaging parts 42c and 43c mounted on the lower surface of the second housing 42 and the third housing 43 the orientations of which are changed if the connecting plates 32 and 33 and the reinforcing plates 38 and 39 are bent downward at right angle. The housing lock means 41c thereby fix the orientations of the housings 42 and 43.

The second housing 42 houses therein the connecting plate 32, the fusible part 36, the external coupling plate 34, and the tip end of the reinforcing plate 38 positioned at one side of the first housing 41 (on the left side in FIG. 1). Both a part of the connecting plate 32 and a part of the reinforcing plate 38 are exposed between the second housing 42 and the first housing 41.

The second housing 42 retains the tip end of the reinforcing plate 38 extending to the second housing 42 so as to bend the reinforcing plate 38 extending to the second housing 42 together with the connecting plate 32 when the connecting plate 32 exposed between the second housing 42 and the first housing 41 is bent.

The second housing 42 has, as illustrated in FIG. 1, a window 42a made with a transparent resin plate on both the upper and lower surfaces in the area housing the fusible part 36 (the surfaces opposing to each other in the plate-thickness direction of the external coupling plate 34). This configuration enables a user to visually observe the state of the housed fusible part 36 from the two directions opposing to each other in the plate-thickness direction of the housed external coupling plate 34. The arrows P1 illustrated in FIGS. 1, 3, and 4 represent the visual observation direction for the fusible part 36.

On the upper and lower surfaces of the second housing 42, the engaging parts 42c are provided. Either one of the engaging parts 42c is locked by the corresponding housing lock means 41c on the first housing 41 if the orientation of the second housing 42 is changed by bending the connecting plate 32 and the reinforcing plate 38. The engaging parts 42 thereby fix the orientation of the second housing 42.

As illustrated in FIG. 3, the engaging part 42c mounted on the upper surface of the second housing 42 engages with the housing lock means 41c mounted on the upper surface of the first housing 41 if the connecting plate 32 and the reinforcing plate 38 are bent upward at right angle. The second housing 42 is thereby fixed to the first housing 41. As illustrated in FIG. 5, the engaging part 42c mounted on the lower surface of the second housing 42 engages with the housing lock means 41c mounted on the lower surface of the first housing 41 if the connecting plate 32 and the reinforcing plate 38 are bent downward at right angle. The second housing 42 is thereby fixed to the first housing 41.

The third housing 43 houses therein the connecting plate 33, the fusible part 37, the external coupling plate 35, and the tip end of the reinforcing plate 39 positioned at the other side of the first housing 41 (on the right side in FIG. 1). Both a part of the connecting plate 33 and a part of the reinforcing plate 39 are exposed between the third housing 43 and the first housing 41.

The third housing 43 retains the tip end of the reinforcing plate 39 extending to the third housing 43 so as to bend the reinforcing plate 39 extending to the third housing 43 together with the connecting plate 33 when the connecting plate 33 exposed between the third housing 43 and the first housing 41 is bent.

The third housing 43 has a window 43a made with a transparent resin plate on both the upper and lower surfaces in the area housing the fusible part 37 (the surfaces opposing to each other in the plate-thickness direction of the external coupling plate 35). This configuration enables a user to visually observe the state of the housed fusible part 37 from the two directions opposing to each other in the plate-thickness direction of the housed external coupling plate 35. The arrows P2 illustrated in FIGS. 1, 3, and 4 represent the visual observation direction for the fusible part 37.

On the upper and lower surfaces of the third housing 43, the engaging parts 43c are provided. Either one of the engaging parts 43c is locked by the corresponding housing lock means 41c on the first housing 41 if the orientation of the third housing 43 is changed by bending the connecting plate 33 and the reinforcing plate 39. The engaging parts 43 thereby fix the orientation of the third housing 43.

As illustrated in FIG. 3, the engaging part 43c mounted on the lower surface of the third housing 43 engages with the housing lock means 41c mounted on the lower surface of the first housing 41 if the connecting plate 33 and the reinforcing plate 39 are bent downward at right angle. The third housing 43 is thereby fixed to the first housing 41. As illustrated in FIG. 4, the engaging part 43c mounted on the upper surface of the third housing 43 engages with the housing lock means 41c mounted on the upper surface of the first housing 41 if the connecting plate 33 and the reinforcing plate 39 are bent upward at right angle. The third housing 43 is thereby fixed to the first housing 41.

As described above, in the fusible link 1 according to the present embodiment, the orientation of the second housing 42 and the orientation of the third housing 43 relative to the first housing 41 can be changed by bending the pairs of the connecting plates 32 and 33 and the reinforcing plates 38 and 39 exposed among the housings.

As described above, in the fusible link 1 according to the present embodiment, the three resin housings 41, 42, and 43 support the fuse element 30, and the pairs of the connecting plates 32 and 33 and the reinforcing plates 38 and 39 exposed among the housings adjacent to each other are bent. This configuration allows the fusible link 1 to be used in a compact state with a tri-fold configuration, thereby achieving reduction in the space for the fusible link 1 mounted on a battery.

The bending orientation of the pairs of the connecting plates 32 and 33 and the reinforcing plates 38 and 39 exposed among the housings adjacent to each other can be selected upward or downward depending on the space on the battery side. In other words, the installation configuration of the fusible link 1 can be selected depending on the space on the battery side, thereby achieving increased flexibility of the fusible link 1.

With the configuration of the fusible link 1 according to the present embodiment, bending the connecting plates 32 and 33 exposed among the housings adjacent to each other also bends the reinforcing plates 38 and 39 at the same time. If some rigidity is provided to the reinforcing plates 38 and 39 for retaining the shape of bend, vibrations of a vehicle are hardly transmitted to the connecting plates 32 and 33 serving as electrically conducting paths. This achieves increased durability of the fuse element 30.

With the configuration of the fusible link 1 according to the present embodiment, the fusible parts 36 and 37 housed respectively in the second housing 42 and the third housing 43 can be visually observed from both surfaces of the resin housings. If the orientation of the second housing 42 and the orientation of the third housing 43 are changed, the corresponding fusible parts 36 and 37 can be visually observed externally. This configuration achieves the increased visibility for the fusible parts 36 and 37.

With the configuration of the fusible link 1 according to the present embodiment, bending the connecting plates 32 and 33 and the reinforcing plates 38 and 39 exposed among the resin housings adjacent to each other fixes the relational position among the housings due to the engagement of the engaging parts 42c and 43c with the respective housing lock means 41c. If vibrations of a vehicle are transmitted to the fusible link 1, the housings are therefore prevented from vibrating with a fulcrum of the connecting plates 32 and 33, or the reinforcing plates 38 and 39. This configuration reduces the potential fatigue failure caused by vibrations of the connecting plates 32 and 33 or the reinforcing plates 38 and 39.

With the configuration of the fusible link 1 according to the present embodiment, if tension works on a cable from an external circuit coupled to the external coupling plates 34 and 35, the tension is prevented from working on the external coupling plates 34 and 35, and the reinforcing plates 38 and 39 as a bending load. This achieves increased durability of the external coupling plates 34 and 35, and the reinforcing plates 38 and 39.

With the configuration of the fusible link 1 according to the present embodiment, the engaging parts 42c and 43c of the respective second housing 42 and the third housing 43 are locked by the housing lock means 41c mounted on the side of the first housing 41 regardless of the bending direction of the connecting plates 32 and 33 and the reinforcing plates 38 and 39, that is, toward the side of the upper surface of the first housing 41 or toward the side of the lower surface of the first housing 41. This configuration allows the second housing 42 and the third housing 43 to be fixed to the first housing 41. Accordingly, regardless of the bending direction of the connecting plates 32 and 33 and the reinforcing plates 38 and 39, the second housing 42 and the third housing 43 the orientations of which are changed can be securely fixed to the first housing 41.

The present invention is not limited to the embodiment described above and can be modified and improved appropriately. The materials, the shapes, the sizes, the numbers, and the disposed positions of the components and parts in the above-described embodiment can be defined arbitrarily for achieving the present invention.

For example, the specific configuration of the engaging parts and the housing lock means for fixing the second or third housing, the orientation of which is changed, to the first housing can be modified appropriately.

The characteristics of the above-described fusible link according to the embodiments of the present invention are briefly listed in [1] to [4] as follows.

[1] A fusible link (1) directly mounted on the battery terminal includes a fuse element (30) integrally formed with a metallic plate and three resin housings (41, 42, 43) supporting the fuse element (30).

The fuse element (30) includes:

a battery coupling plate (31) coupled to a battery terminal;

a pair of connecting plates (32, 33) that extend outward from the respective side edges opposing to each other of the battery coupling plate (31) in opposing directions thereof;

two external coupling plates (34, 35) that each couple to an external circuit and are disposed on both sides of the battery coupling plate (31) in a separate state from the connecting plates (32, 33) and the battery coupling plate (31) in an area surrounded with the connecting plates (32, 33) and the side edges (31b, 31c) of the battery coupling plate (31) from which the connecting plates (32, 33) extend; and fusible parts (36, 37) that each conductively couple the connecting plates (32, 33) to the respective external coupling plates (34, 35) opposing to each other and are fused if a current with a value equal to or larger than a rated current value flows.

The three resin housings (41, 42, 43) include:

a first housing (41) that houses therein the battery coupling plate (31) so that the pair of connecting plates (32, 33) externally protrude;

a second housing (42) that houses therein the connecting plate (32), the fusible part (36), and the external coupling plate (34) positioned at one side of the first housing (41), in a state in which a part of the connecting plate (32) is exposed between the second housing (42) and the first housing (41); and a third housing (43) that houses therein the connecting plate (33), the fusible part (37), and the external coupling plate (35) positioned at another side of the first housing (41), in a state in which a part of the connecting plate (33) is exposed between the third housing (43) and the first housing (41). The orientation of the second housing (42) and the orientation of the third housing (43) relative to the first housing (41) can be changed by bending the connecting plates (32, 33) exposed among the housings.

[2] The fusible link (1) according to [1], wherein
on both side edges (31b, 31c) of the battery coupling plate (31), reinforcing plates (38, 39) extending from the side edges (31b, 31c) of the battery coupling plate (31) are integrally formed in parallel with the connecting plates (32, 33), respectively, and the second housing (42) and the third housing (43) retain a tip end of the reinforcing plates (38, 39) extending to the second housing (42) or the third housing (43) so as to bend the reinforcing plates (38, 39) extending to the second housing (42) or the third housing (43) together with the connecting plates (32, 33).

[3] The fusible link (1) according to [1] or [2], wherein the first housing (41) includes a housing lock means (41c) that fixes the orientation of the second housing (42) or the third housing (43) by engaging with engaging parts (42c, 43c) on the housings the orientation of which is changed by bending of the connecting plates (32, 33).

[4] The fusible link (1) according to [3], wherein the housing lock means (41c) is mounted on each of the positions nearer to both side edges on both outer surfaces opposing to each other in a plate-thickness direction of the battery coupling plate (31).

With the configuration of a fusible link according to an embodiment of the present invention, the installation configuration of the fusible link can be selected depending on the space on a battery side, thereby achieving increased flexibility of and the reduction in the space for the fusible link mounted on the battery.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fusible link directly mounted on a battery terminal, the fusible link comprising:
    a fuse element integrally formed from a metallic plate; and
    three resin housings supporting the fuse element, wherein the fuse element includes:
        a battery coupling plate coupled to the battery terminal;
        a pair of connecting plates extending outward from respective opposing side edges of the battery coupling plate;
        two external coupling plates coupled to an external circuit and disposed on opposite sides of the battery coupling plate, the external coupling plates being disposed in an area surrounded by the side edges of the battery coupling plate, from which the connecting plates extend and the connecting plates; and
        fusible parts respectively conductively coupling the connecting plates to the external coupling plates, the fusible parts being fused when a current having a value equal to or higher than a rated current value flows through the fusible parts,
    the three resin housings include:
        a first housing housing therein the battery coupling plate so that the pair of connecting plates externally protrude;
        a second housing housing therein a first one of each of the connecting plates, the fusible parts, and the external coupling plates positioned at one side of the first housing, in a state in which a first exposed part of the first one connecting plate is exposed between the second housing and the first housing; and
        a third housing housing therein a second one of each of the connecting plates, the fusible parts, and the external coupling plate positioned at a second side of the first housing, in a state in which a second exposed part of the second one connecting plate is exposed between the third housing and the first housing, and
    wherein orientation of the second housing and orientation of the third housing relative to the first housing is adjustable by bending the exposed parts of the connecting plates.

2. The fusible link according to claim 1, wherein
on both side edges of the battery coupling plate, reinforcing plates extending from the side edges of the battery coupling plate are integrally formed in parallel with the connecting plates, and
the second housing and the third housing each retain a tip end of the respective reinforcing plates extending to the second housing or the third housing so as to bend the reinforcing plates extending to the second housing or the third housing together with the respective connecting plates.

3. The fusible link according to claim 1, wherein the first housing includes a housing lock part fixing the orientation of the second housing or the third housing by engaging with an associated engaging part on the second or third housing when the orientation thereof is changed by bending the exposed parts of the connecting plates.

4. The fusible link according to claim 3, wherein the housing lock part includes a pair of housing lock parts which are respectively disposed on opposite side portions of a surface of the battery coupling plate.

5. The fusible link according to claim 2, wherein the first housing includes a housing lock part fixing the orientation of the second housing or the third housing by engaging with an associated engaging part on the second or third housing when the orientation thereof is changed by bending the exposed parts of the connecting plates.

6. The fusible link according to claim 5, wherein the housing lock part includes a pair of housing lock parts which are respectively disposed on opposite side portions of a surface of the battery coupling plate.

* * * * *